United States Patent [19]

Weaver et al.

[11] Patent Number: 4,530,997

[45] Date of Patent: Jul. 23, 1985

[54] AZO DYES FROM SULFONATED 3-SULFONATED 3-AMINO-2,1-BENZISOTHIAZOLES WITH 1,2,3,4-TETRAHYDROQUINOLINE OR 2,3-DIHYDRO-1,4-BENZOXAZINE COUPLERS

[75] Inventors: Max A. Weaver; Ralph R. Giles, both of Kingsport, Tenn.

[73] Assignee: Eastman Kodak Company, Rochester, N.Y.

[21] Appl. No.: 475,566

[22] Filed: Mar. 15, 1983

[51] Int. Cl.³ .............. C09B 29/045; C09B 29/039; C09B 29/36; C09B 29/44
[52] U.S. Cl. .............................. 534/768; 534/738
[58] Field of Search ............. 260/158, 155, 152; 534/768, 728

[56] References Cited

U.S. PATENT DOCUMENTS 4,070,352  1/1978  Maner et al. ............... 260/158 X

OTHER PUBLICATIONS

Venkataraman, "The Chemistry of Synthetic Dyes", vol. I, p. 270, (1952).

Primary Examiner—Floyd D. Higel

Attorney, Agent, or Firm—Donald W. Spurrell; Daniel B. Reece, III

[57] ABSTRACT

Disclosed are azo dyes in which the diazo component is a diazotized 3-amino-2,1-benzisothiazole compound bearing one or two sulfo groups, and the coupler is either a 1,2,3,4-tetrahydroquinoline or a 2,3-dihydro-1,4-benzoxazine compound. These dyes exhibit excellent dyeing and fastness properties on polyamide fibers and also impart color to cellulose acetate fibers and wool. The dyes correspond to the general formula:

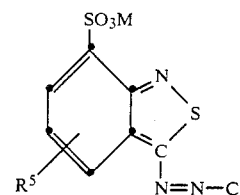

wherein $R^5$ is 0-3 substituents independently selected from halogen, cyano, alkyl, alkoxy, sulfo, and the like; M is $H^+$, $Na^+$, $K^+$ or the like; and C is the coupler which may be substituted with groups known to the art.

10 Claims, No Drawings

AZO DYES FROM SULFONATED 3-SULFONATED 3-AMINO-2,1-BENZISOTHIAZOLES WITH 1,2,3,4-TETRAHYDROQUINOLINE OR 2,3-DIHYDRO-1,4-BENZOXAZINE COUPLERS

This invention relates to azo dyes in which the diazo component is from a 3-amino-2,1-benzisothiazole compound bearing one or two sulfo groups, and the coupler is a 1,2,3,4-tetrahydroquinoline or 2,3-dihydro-1,4-benzoxazine compound. These dyes, in general, exhibit excellent dyeing and fastness properties on polyamide fibers, imparting neutral to greenish blue shades thereto, and also impart color to cellulose acetate fibers and wool, and are particularly valuable in not flaring red under artificial light while retaining good lightfastness.

The dyes correspond to the general formula:

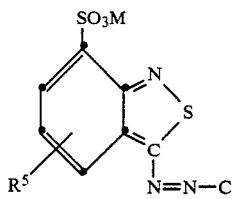

wherein $R^5$ is 0–3 substituents independently selected from halogen, cyano, alkyl, alkoxy, alkylthio, alkylsulfonyl, sulfamoyl, alkylsulfamoyl, alkanoyloxy, carbamoyl, alkylcarbamoyl, alkoxycarbonyl, acylamido, and $SO_3M$; M is selected from $H^+$, $NH_4^+$, $Na^+$, $K^+$, and the colorless cations of salts of primary, secondary, and tertiary aliphatic and aryl amines; C is a coupler having the formula

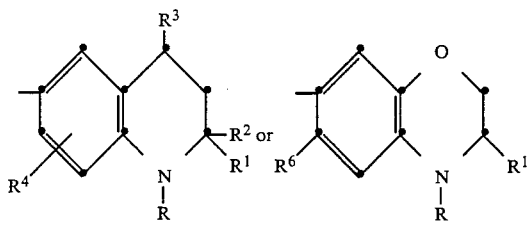

wherein R is selected from hydrogen, alkyl, aryl, and cycloalkyl; $R^1$, $R^2$, and $R^3$ are each selected from hydrogen and alkyl; $R^4$ is 0–2 substituents and $R^6$ is 0 or 1 substituent selected from alkyl, alkoxy, halogen, acylamido, alkylthio, and aryloxy; and wherein the alkyl moieties of R, $R^4$, $R^5$ and $R^6$, e.g. of the alkoxy groups, are unsubstituted or substituted with 1–3 substituents independently selected from halogen, CN, OH, alkoxy, aryloxy, alkoxyalkoxy, alkanoyl, alkanoyloxy, carbamoyl, alkylcarbamoyl, sulfamoyl, alkylsulfamoyl, aryl, alkoxycarbonyl, alkoxyalkanoyloxy, and cycloalkyl.

Typical of the amines which may be used to form the "M" salts are triethylamine, tri(2-hydroxyethyl)amine, di(2-hydroxyethyl)amine, and N,N-dimethylaniline.

Preferred of the present dyes are those wherein: $R^5$ is 0–3 substituents independently selected from Cl, Br, alkyl, alkoxy, and $—SO_3M$; R is alkyl, or alkyl substituted with 1–3 substituents independently selected from hydroxy, Cl, Br, alkoxy, carbamoyl, alkanoyloxy, alkoxycarbonyl, cyano, phenyl, and sulfamoyl; $R^1$, $R^2$ and $R^3$ are each independently selected from H and methyl; and $R^4$ is 0–2 substituents independently selected from alkyl, alkoxy, alkylthio, phenyl, and acylamido. The most preferred of the above dyes are those wherein $R^5$ is H or one of said preferred substituents in the 4 or 5 position, and $R^4$ is H or one of said preferred substituents in the seven position.

The alkyl and alkylene moieties within the definitions of the above R–$R^6$ groups contain from 1–6 carbons and are straight or branched chain, and the aryl groups have 6–10 ring carbons.

The dyes of this invention impart blue to greenish blue shades to fibers, particularly polyamides, and are especially useful for dyeing polyamide (nylon) carpets, giving improvements over such dyes as shown, for example, in German Offenlegungsschrift Nos. 2,716,033 and 2,805,304, in one or more properties such as fastness to light, ozone, oxides of nitrogen, perspiration, washing, sublimation, and crocking, leveling, migration, transfer, exhaustion, build, barre coverage, pH stability, and insensitivity to pesticides such as those containing organic phosphate esters.

This invention will be exemplified further by the following examples, although it will be understood that these examples are included merely for the purpose of illustration and are not intended to limit the scope of the invention. The diazo and coupler components of the present dyes can be prepared by procedures well-known in the art.

EXAMPLE 1

A solution of 10.0 g. of 3-amino-2,1-benzisothiazole in 100 g. of concentrated $H_2SO_4$ was heated at 50°–55° C. for one-half hour, then cooled and added to 500 ml. of cold acetone. The product was removed by filtration and then reprecipitated from bicarbonate solution by addition of sufficient acetic acid to give a pH of 4.75–4.80. 8.5 Grams of purified 3-amino-2,1-benzisothiazole-7-sulfonic acid product was obtained.

A 0.025 mol. portion (5.76 g.) of the above sulfonic acid product was dissolved in 50 ml. of aqueous KOH (1.2 g. KOH), 50 g. of ice added, and then 6.9 g. of $NaNO_2$ added, followed by dropwise addition of 10 ml. of 37% HCl. The temperature was then maintained at 0° to 5° C. for one hour and the excess nitrite then destroyed with sulfamic acid.

A 0.025 mol. portion of the coupler 1-(2-hydroxyethyl)-2,2,4,7-tetramethyl-1,2,3,4-tetrahydroquinoline (5.84 g.) was dissolved in 75 ml. of 6% HCl, the solution chilled in an ice bath and the above diazonium solution added thereto. Sodium acetate was added after 30 min. to obtain a pH of 4–5 and the product was removed by filtration after an additional one hour in the ice bath. Dilute NaCl solution (10%) was used to wash the precipitate. The dried dye weighed 10.85 g. and its formula is that of the first dye of Table I.

EXAMPLE 2

Fifteen g. of 3-amino-5-chloro-2,1-benzisothiazole were added to 90 g. of 20% oleum, with external cooling to prevent the temperature from exceeding 60° C. After one-half hour at 60° C. the solution was cooled and added to 520 ml. of cold acetone. A 7.9 g. portion of pure sulfonic acid product was removed by filtration of the chilled acetone mixture, and an additional 5.2 g. of product, only slightly less pure, were recovered by evaporating a major part of the acetone and drowning the remaining solution in water.

The 3-amino-5-chloro-2,1-benzisothiazole-7-sulfonic acid was diazotized in a nitrosyl sulfuric acid solution prepared from 2.16 g. of $NaNO_2$ in 15 ml. of concentrated $H_2SO_4$ below 70° C. At below 25° C., 15 ml. of 1:5 acid (propionic:acetic) were added to the above solution followed by 0.03 mol (7.94 g.) of the amine at 0° C., followed by 15 ml. more of 1:5 acid. The temperature was held at 0° to −2° C. for two hours before treatment with sulfamic acid to destroy excess nitrite.

A 0.03 mol. portion of the coupler 1-ethyl-2,2,4,7-tetramethyl-1,2,3,4-tetrahydroquinoline (6.52 g.) was dissolved in 150 ml. of 15% $H_2SO_4$, the solution chilled in an ice bath and the above diazonium solution added thereto. Sodium hydroxide solution (25%) and ice were then added until a pH of 4.15 was reached. After one hour, the dye was removed by filtration, extracted with water at 65°–70° C., and NaCl added with cooling to get the final precipitate which was washed with 2% NaCl solution and dried to constant weight. A yield of 9.09 g. of dye product was obtained. The following tables give additional examples of the present dyes which are prepared as above.

TABLE I

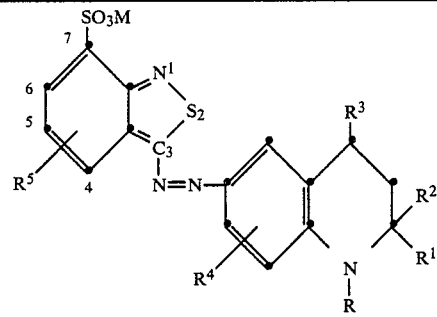

| Number | $R^5$ | R | $R^1$ | $R^2$ | $R^3$ | $R^4$ | M |
|---|---|---|---|---|---|---|---|
| 1 | H | $CH_2CH_2OH$ | $CH_3$ | $CH_3$ | $CH_3$ | 7-$CH_3$ | $H^+$ |
| 2 | H | $C_2H_5$ | $CH_3$ | $CH_3$ | $CH_3$ | 7-$CH_3$ | $H^+$ |
| 3 | H | $C_4H_9(n)$ | $CH_3$ | $CH_3$ | $CH_3$ | 7-$CH_3$ | $H^+$ |
| 4 | 5-$SO_3H$ | H | $CH_3$ | $CH_3$ | $CH_3$ | 7-$CH_3CONH$ | $H^+$ |
| 5 | H | $C_6H_5$ | $CH_3$ | H | H | 5-$CH_3$ | $H^+$ |
| 6 | 5-CN | $CH_2CH_2OH$ | $CH_3$ | H | H | 5-$OC_2H_5$ | $H^+$ |
| 7 | H | $CH_2CH_2Cl$ | $CH_3$ | $CH_3$ | $CH_3$ | H | $H^+$ |
| 8 | H | $CH_2CH_2OC_4H_9(n)$ | $CH_3$ | H | H | 8-Cl | $H^+$ |
| 9 | 5-$SC_2H_5$ | $C_2H_5$ | H | H | H | 7-$CH_3COHN$ | $Na^+$ |
| 10 | H | $CH_2CH_2CONH_2$ | $CH_3$ | H | H | 7-$CH_3$ | $Na^+$ |
| 11 | 5-$SO_2Na$ | $CH_2CH_2CONHC_2H_5$ | $CH_3$ | $CH_3$ | $CH_3$ | 7-Br | $Na^+$ |
| 12 | 4-CN, 5-Cl | $C_6H_{11}$ | $CH_3$ | $CH_3$ | $CH_3$ | 5,7-di-$CH_3$ | $K^+$ |
| 13 | 4,5-di-Cl—6-$CH_3$ | $CH_2CH_2OH$ | $CH_3$ | $CH_3$ | $CH_3$ | 5,7-di-$CH_3$ | $K^+$ |
| 14 | H | $CH_2OC_6H_5$ | $CH_3$ | $CH_3$ | $CH_3$ | 7-$SCH_3$ | $K^+$ |
| 15 | 5-$SO_2CH_3$ | $CH_2CH_2OCH_2CH_2OCH_2CH_3$ | $CH_3$ | $CH_3$ | $CH_3$ | 7-$CH_3CONH$ | $K^+$ |
| 16 | H | $CH_2COCH_3$ | $CH_3$ | H | H | 7-$CH_3CH_2CONH$ | $K^+$ |
| 17 | 6-$SO_2NH_2$ | $CH_2CH_2Cl$ | $CH_3$ | H | H | 7-$CH_3$ | $NH_4^+$ |
| 18 | H | $(CH_2)_3OH$ | $CH_3$ | H | H | 7-$OC_6H_5$ | $NH_4^+$ |
| 19 | 5-$SO_3HN(Et)_3$ | $CH_3CONH$ | $CH_3$ | $CH_3$ | $CH_3$ | 7-$C_6H_5CONH$ | $N^+H(Et)_3$ |
| 20 | H | $C_2H_5$ | $CH_3$ | $CH_3$ | $CH_3$ | 7-$CH_3SO_2NH$ | $N^+H(Et)_3$ |
| 21 | 5-$CONH_2$ | $CH_2CH_2OOCCH_3$ | $CH_3$ | $CH_3$ | $CH_3$ | 7-$CH_3CONH$ | $NH_4^+$ |
| 22 | H | $CH_2CH_2OC_4H_9(n)$ | $CH_3$ | $CH_3$ | $CH_3$ | 7-$CH_3CONH$ | $N^+H(Et)_3$ |
| 23 | H | $C_2H_5$ | $CH_3$ | $CH_3$ | $CH_3$ | 7-HCONH | $N^+H(Et)_3$ |
| 24 | 5-Cl | $CH_2CH_2COOCH_3$ | $CH_3$ | $CH_3$ | $CH_3$ | 7-$CH_3$ | $N^+H(Et)_3$ |
| 25 | 5-Cl | $CH_2CH_2CONH_2$ | $CH_3$ | $CH_3$ | $CH_3$ | 7-$CH_3$ | $N^+H(CH_2CH_2OH)_3$ |
| 26 | 5-Cl | $CH_2CH_2CN$ | $CH_3$ | $CH_3$ | $CH_3$ | 7-$CH_3$ | $N^+H(CH_2CH_2OH)_3$ |
| 27 | 4-$OOCCH_3$ | $C_4H_9(-n)$ | $CH_3$ | $CH_3$ | $CH_3$ | 7-$CH_3$ | $N^+H(CH_2CH_2OH)_3$ |
| 28 | 5-$CH_2CONHCH_3$ | $CH_2C_6H_5$ | $CH_3$ | $CH_3$ | $CH_3$ | 7-$C_6H_5$ | $N^+H(CH_2CH_2OH)_3$ |
| 29 | H | $CH_2CONHCH_3$ | $CH_3$ | $CH_3$ | $CH_3$ | 7-$C_6H_5CH_2CONH$ | $N^+H_2(CH_2CH_2OH)_2$ |
| 30 | 5-Br | $CH_2SO_2NHCH_3$ | $CH_3$ | $CH_3$ | $CH_3$ | 7-$CH_3$ | $N^+H_2(CH_2CH_2OH)_2$ |
| 31 | 5-$CH_2SO_2NHCH_3$ | $(CH_3)_2CH$ | $CH_3$ | H | H | 7-$CH_3$ | $N^+H_2(CH_2CH_2OH)_2$ |
| 32 | 5-Br | $(CH_3)_2CHCH_2$ | $CH_3$ | $CH_3$ | $CH_3$ | 7-$CH_3CONH$ | $N^+H_2(CH_2CH_2OH)_2$ |
| 33 | 4-$CHCOCH_3$ | $CH_2CH_2CONH_2$ | $CH_3$ | $CH_3$ | $CH_3$ | 7-$CH_3$ | $N^+H(CH_3)_2C_6H_5$ |
| 34 | 4,5,6-tri-Cl | $C_2H_5$ | $CH_3$ | H | H | 7-$CH_3$ | $N^+H(CH_3)_2C_6H_5$ |
| 35 | H | $CH_2CH_2SO_2NH_2$ | $CH_3$ | $CH_3$ | $CH_3$ | 7-$CH_3CH_2CONH$ | $N^+H(CH_3)_2C_6H_5$ |
| 36 | 5-Me | $CH_2OOCCH_2CH_2OCH_3$ | $CH_3$ | $CH_3$ | $CH_3$ | 7-$CH_3$ | $NH_4^+$ |
| 37 | 5-Me | $CH_2CH_2CONH_2$ | $CH_3$ | $CH_3$ | $CH_3$ | 7-$CH_3CONH$ | $NH_4^+$ |
| 38 | 5-$SO_3NH_4$ | $CH_2CH_2OC_2H_5$ | $CH_3$ | $CH_3$ | $CH_3$ | 7-$C_6H_5$ | $NH_4^+$ |
| 39 | 4-MeO | $CH_2C_6H_{11}$ | $CH_3$ | $CH_3$ | $CH_3$ | 7-$CH_3$ | $NH_4^+$ |
| 40 | 4-MeO | $CH_2CH_2OH$ | $CH_3$ | $CH_3$ | $CH_3$ | 7-$CH_3$ | $H^+$ |
| 41 | 4-MeO | $CH(OH)CH_2CH_2OH$ | $CH_3$ | $CH_3$ | $CH_3$ | 7-$CH_3CONH$ | $H^+$ |
| 42 | 5-$SO_3H$ | $C_2H_5$ | $CH_3$ | $CH_3$ | $CH_3$ | 7-$CH_3$ | $H^+$ |
| 43 | 5-$SO_3H$ | $CH_2CH_2OH$ | $CH_3$ | $CH_3$ | $CH_3$ | 7-$OCH_3$ | $H^+$ |
| 44 | 5-$SO_3H$ | $CH_2CH_2OH$ | $CH_3$ | $CH_3$ | $CH_3$ | H | $H^+$ |
| 45 | 5-$NHSO_2CH_3$ | $CH_2CH_2Br$ | $CH_3$ | $CH_3$ | $CH_3$ | 7-$CH_3CH_2CONH$ | $H^+$ |
| 46 | H | $CH_2CH_2I$ | $CH_3$ | $CH_3$ | $CH_3$ | 7-HCONH | $H^+$ |
| 47 | H | —$CH_2CF_3$ | $CH_3$ | H | H | 7-$C_6H_5$ | $H^+$ |
| 48 | 5-$COOCH_3$ | $CH_2C_6H_5$ | $CH_3$ | H | H | 7-$CH_3CONH$ | $H^+$ |
| 49 | H | $CH_2C_6H_5$ | $CH_3$ | $CH_3$ | $CH_3$ | 7-$CH_3CONH$ | $H^+$ |
| 50 | H | $C_2H_5$ | $CH(CH_3)_2$ | H | H | 7-$CH_3$ | $H^+$ |

TABLE II-continued

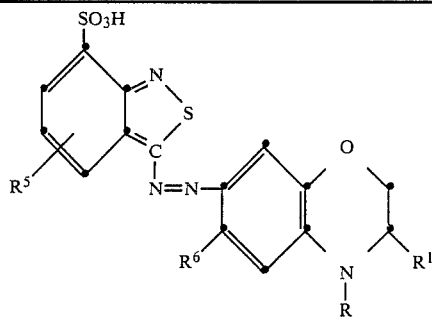

| Number | R⁵ | R | R¹ | R⁶ | M |
|---|---|---|---|---|---|
| 26 | 5-Cl | CH₂CH₂CN | CH₃ | CH₃ | N⁺H(CH₂CH₂OH)₃ |
| 27 | 4-OOCCH₃ | C₄H₉(n) | CH₃ | CH₃ | N⁺H(CH₂CH₂OH)₃ |
| 28 | 5-CH₂CONHCH₃ | CH₂C₆H₅ | CH₃ | CH₃ | N⁺H(CH₂CH₂OH)₃ |
| 29 | H | CH₂CONHCH₃ | CH₃ | C₆H₅CH₂CONH | N⁺H₂(CH₂CH₂OH)₂ |
| 30 | 5-Br | CH₂SO₂NHCH₃ | CH₃ | CH₃ | N⁺H₂(CH₂CH₂OH)₂ |
| 31 | 5-CH₂SO₂NHCH₃ | (CH₃)₂CH | CH₃ | CH₃ | N⁺H₂(CH₂CH₂OH)₂ |
| 32 | 5-Br | (CH₃)₂CHCH₂ | CH₃ | CH₃CONH | N⁺H₂(CH₂CH₂OH)₂ |
| 33 | 4-NHCOCH₃ | CH₂CH₂CONH₂ | CH₃ | CH₃ | N⁺H(CH₃)₂C₆H₅ |
| 34 | 4,5,6-tri-Cl | C₂H₅ | CH₃ | CH₃ | N⁺H(CH₃)₂C₆H₅ |
| 35 | H | CH₂CH₂SO₂NH₂ | CH₃ | CH₃CH₂CONH | N⁺H(CH₃)₂C₆H₅ |
| 36 | 5-Me | CH₂OOCCH₂CH₂OCH₃ | CH₃ | CH₃ | NH₄⁺ |
| 37 | 5-Me | CH₂CH₂CONH₂ | CH₃ | CH₂CONH | NH₄⁺ |
| 38 | 5-SO₃NH₄ | CH₂CH₂OC₂H₅ | CH₃ | C₆H₅ | NH₄⁺ |
| 39 | 4-MeO | CH₂C₆H₁₁ | CH₃ | CH₃ | NH₄⁺ |
| 40 | 4-MeO | CH₂CH₂OH | CH₃ | CH₃ | H⁺ |
| 41 | 4-MeO | CH(OH)CH₂CH₂OH | CH₃ | CH₃CONH | H⁺ |
| 42 | 5-SO₃H | C₂H₅ | CH₃ | CH₃ | H⁺ |
| 43 | 5-SO₃H | CH₂CH₂OH | CH₃ | OCH₃ | H⁺ |
| 44 | 5-SO₃H | CH₂CH₂OH | CH₃ | H | H⁺ |
| 45 | 5-NHSO₂CH₃ | CH₂CH₂Br | CH₃ | CH₃CH₂CONH | H⁺ |
| 46 | H | CH₂CH₂I | CH₃ | HCONH | H⁺ |
| 47 | H | CH₂CF₃ | CH₃ | C₆H₅ | H⁺ |
| 48 | 5-COOCH₃ | CH₂C₆H₅ | CH₃ | CH₃CONH | H⁺ |
| 49 | H | CH₂C₆H₅ | CH₃ | CH₃CONH | H⁺ |
| 50 | H | C₂H₅ | CH(CH₃)₂ | CH₃ | H⁺ |
| 51 | CH₂CHClCH₂Cl | CH₂CH₂OH | CH₃ | CH₃ | H⁺ |
| 52 | CH₂CN | C₂H₅ | CH₃ | CH₃ | H⁺ |
| 53 | CH₂CH₂OH | C₄H₉(n) | CH₃ | CH₃ | H⁺ |
| 54 | CH₂CH₂OC₂H₅ | H | CH₃ | CH₃ | H⁺ |
| 55 | CH₂OCPh | C₆H₅ | CH₃ | H | H⁺ |
| 56 | CH₂CH₂OCH₂CH₂OC₂H₅ | CH₂CH₂OH | CH₃ | H | H⁺ |
| 57 | CH₂OCCH₃ | CH₂CH₂Cl | CH₃ | CH₃ | H⁺ |
| 58 | CH₂OOCCH₃ | CH₂CH₂OC₄H₉(n) | CH₃ | H | H⁺ |
| 59 | CH₂CONH₂ | C₂H₅ | H | H | Na⁺ |
| 60 | CH₂CONHC₂H₅ | CH₂CH₂CONH₂ | CH₃ | H | Na⁺ |
| 61 | CH₂CH₂SO₂NH₂ | CH₂CH₂CONHC₂H₅ | CH₃ | CH₃ | Na⁺ |
| 62 | CH₂SO₂NHCH₃ | C₆H₁₁ | CH₃ | CH₃ | K⁺ |
| 63 | CH₂Ph | CH₂CH₂OH | CH₃ | CH₃ | K⁺ |
| 64 | CH₂COOCH₃ | CH₂OC₆H₅ | CH₃ | CH₃ | K⁺ |
| 65 | CH₂OOCCH₂OCH₃ | CH₂CH₂OCH₂CH₂OCH₂CH₃ | CH₃ | CH₃ | K⁺ |
| 66 | CH₂—C₆H₁₁ | CH₂COCH₃ | CH₃ | H | K⁺ |
| 67 | CF₃ | CH₂CH₂Cl | CH₃ | H | NH₄⁺ |
| 68 | CH(OH)CH(OH)CH₂OH | (CH₂)₃OH | CH₃ | H | NH₄⁺ |

0326B

The invention has been described in detail with particular reference to preferred embodiments thereof, but it will be understood that variations and modifications can be effected within the spirit and scope of the invention.

We claim:

1. A dye according to the formula:

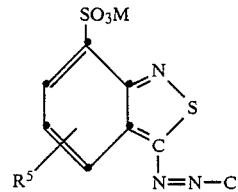

wherein R⁵ is 0–3 substituents independently selected from halogen, cyano, alkyl, alkoxy, alkylthio, alkylsulfonyl, sulfamoyl, alkylsulfamoyl, alkanoyloxy, carbamoyl, alkylcarbamoyl, alkoxycarbonyl, alkanoylamino, and SO₃M; M is selected from H⁺, NH₄⁺, Na⁺, K⁺, and the colorless cations of salts of triethylamine, tri(2-

TABLE I-continued

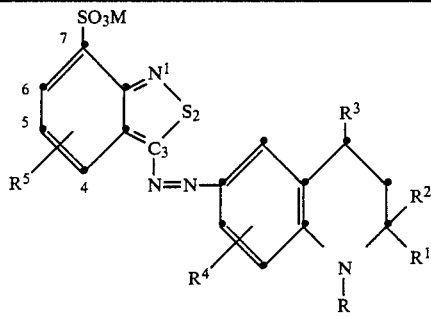

| Number | R⁵ | R | R¹ | R² | R³ | R⁴ | M |
|---|---|---|---|---|---|---|---|
| 51 | $CH_2CHClCH_2Cl$ | $CH_2CH_2OH$ | $CH_3$ | $CH_3$ | $CH_3$ | 7-CH(OH)CH(OH)CH$_2$OH | H⁺ |
| 52 | $CH_2CN$ | $C_2H_5$ | $CH_3$ | $CH_3$ | $CH_3$ | 7-CF$_3$ | H⁺ |
| 53 | $CH_2CH_2OH$ | $C_4H_9(n)$ | $CH_3$ | $CH_3$ | $CH_3$ | 7-CH$_2$—C$_6$H$_{11}$ | H⁺ |
| 54 | $CH_2CH_2OC_2H_5$ | H | $CH_3$ | $CH_3$ | $CH_3$ | 7-CH$_2$OOCCH$_2$OCH$_3$ | H⁺ |
| 55 | $CH_2OCPh$ | $C_6H_5$ | $CH_3$ | H | H | 7-CH$_2$COOCH$_3$ | H⁺ |
| 56 | $CH_2CH_2OCH_2CH_2OC_2H_5$ | $CH_2CH_2OH$ | $CH_3$ | H | H | 7-CH$_2$Ph | H⁺ |
| 57 | $CH_2OCCH_3$ | $CH_2CH_2Cl$ | $CH_3$ | $CH_3$ | $CH_3$ | 7-CH$_2$SO$_2$NHCH$_3$ | H⁺ |
| 58 | $CH_2OOCCH_3$ | $CH_2CH_2OC_4H_9(n)$ | $CH_3$ | H | H | 7-CH$_2$CH$_2$SO$_2$NH$_2$ | H⁺ |
| 59 | $CH_2CONH_2$ | $C_2H_5$ | H | H | H | 7-CH$_2$CONHC$_2$H$_5$ | Na⁺ |
| 60 | $CH_2CONHC_2H_5$ | $CH_2CH_2CONH_2$ | $CH_3$ | H | H | 7-CH$_2$CONH$_2$ | Na⁺ |
| 61 | $CH_2CH_2SO_2NH_2$ | $CH_2CH_2CONHC_2H_5$ | $CH_3$ | $CH_3$ | $CH_3$ | 7-CH$_2$OOCCH$_3$ | Na⁺ |
| 62 | $CH_2SO_2NHCH_3$ | $C_6H_{11}$ | $CH_3$ | $CH_3$ | $CH_3$ | 7-CH$_2$OCCH$_3$ | K⁺ |
| 63 | $CH_2Ph$ | $CH_2CH_2OH$ | $CH_3$ | $CH_3$ | $CH_3$ | 7-CH$_2$CH$_2$OCH$_2$CH$_2$OC$_2$H$_5$ | K⁺ |
| 64 | $CH_2COOCH_3$ | $CH_2OC_6H_5$ | $CH_3$ | $CH_3$ | $CH_3$ | 7-CH$_2$OCPh | K⁺ |
| 65 | $CH_2OOCCH_2OCH_3$ | $CH_2OCH_2CH_2CH_3$ | $CH_3$ | $CH_3$ | $CH_3$ | 7-CH$_2$CH$_2$OC$_2$H$_5$ | K⁺ |
| 66 | $CH_2$—$C_6H_{11}$ | $CH_2CH_2OH$ | $CH_3$ | H | H | 7-CH$_2$CH$_2$OH | K⁺ |
| 67 | $CF_3$ | $CH_2CH_2Cl$ | $CH_3$ | H | H | 7-CH$_2$CN | NH$_4^+$ |
| 68 | CH(OH)CH(OH)CH$_2$OH | (CH$_2$)$_3$OH | $CH_3$ | H | H | 7-CH$_2$CHClCH$_2$Cl | NH$_4^+$ |

TABLE II

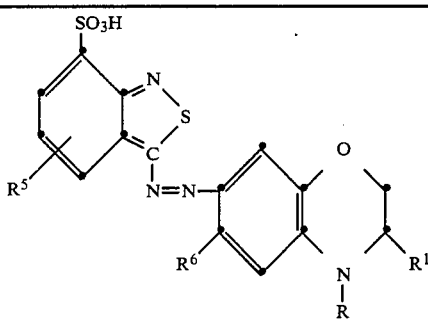

| Number | R⁵ | R | R¹ | R⁶ | M |
|---|---|---|---|---|---|
| 1 | H | $CH_2CH_2OH$ | $CH_3$ | $CH_3$ | H⁺ |
| 2 | H | $C_2H_5$ | $CH_3$ | $CH_3$ | H⁺ |
| 3 | H | $C_4H_9(n)$ | $CH_3$ | $CH_3$ | H⁺ |
| 4 | 5-SO$_3$H | H | $CH_3$ | CH$_3$CONH | H⁺ |
| 5 | H | $C_6H_5$ | $CH_3$ | $CH_3$ | H⁺ |
| 6 | 5-CN | $CH_2CH_2OH$ | $CH_3$ | OC$_2$H$_5$ | H⁺ |
| 7 | H | $CH_2CH_2Cl$ | $CH_3$ | H | H⁺ |
| 8 | H | $CH_2CH_2OC_4H_9(n)$ | $CH_3$ | Cl | H⁺ |
| 9 | 5-SC$_2$H$_5$ | $C_2H_5$ | H | CH$_3$CONH | Na⁺ |
| 10 | H | $CH_2CH_2CONH_2$ | $CH_3$ | $CH_3$ | Na⁺ |
| 11 | 5-SO$_3$Na | $CH_2CH_2CONHC_2H_5$ | $CH_3$ | Br | Na⁺ |
| 12 | 4-CN, 5-Cl | $C_6H_{11}$ | $CH_3$ | $CH_3$ | K⁺ |
| 13 | 4,5-di-Cl—6-CH$_3$ | $CH_2CH_2OH$ | $CH_3$ | $CH_3$ | K⁺ |
| 14 | H | $CH_2OC_6H_5$ | $CH_3$ | SCH$_3$ | K⁺ |
| 15 | 5-SO$_2$CH$_3$ | $CH_2CH_2OCH_2CH_2OCH_2CH_3$ | $CH_3$ | CH$_3$CONH | K⁺ |
| 16 | H | $CH_2COCH_3$ | $CH_3$ | CH$_3$CH$_2$CONH | K⁺ |
| 17 | 6-SO$_2$NH$_2$ | $CH_2CH_2Cl$ | $CH_3$ | $CH_3$ | NH$_4^+$ |
| 18 | H | (CH$_2$)$_3$OH | $CH_3$ | OC$_6$H$_5$ | NH$_4^+$ |
| 19 | 5-SO$_3$HN(Et)$_3$ | $CH_2CONH_2$ | $CH_3$ | C$_6$H$_5$CONH | N⁺H(Et)$_3$ |
| 20 | H | $C_2H_5$ | $CH_3$ | CH$_3$SO$_2$NH | N⁺H(Et)$_3$ |
| 21 | 5-CONH$_2$ | $CH_2CH_2OOCCH_3$ | $CH_3$ | CH$_3$CONH | NH$_4^+$ |
| 22 | H | $CH_2CH_2OC_4H_9(n)$ | $CH_3$ | CH$_3$CONH | N⁺H(Et)$_3$ |
| 23 | H | $C_2H_5$ | $CH_3$ | HCONH | N⁺H(Et)$_3$ |
| 24 | 5-Cl | $CH_2CH_2COOCH_3$ | $CH_3$ | $CH_3$ | N⁺H(Et)$_3$ |
| 25 | 5-Cl | $CH_2CH_2CONH_2$ | $CH_3$ | $CH_3$ | N⁺H(CH$_2$CH$_2$OH)$_3$ | hydroxyethyl)amine, di(2-hydroxyethyl)amine, or N,N-dimethylaniline; C is a coupler having the formula

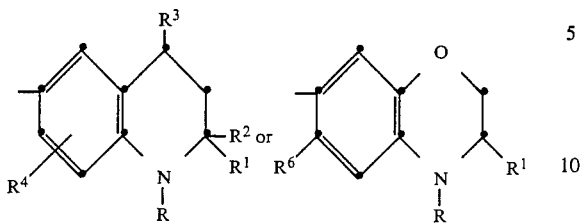

wherein R is selected from hydrogen, alkyl, aryl, and cycloalkyl; $R^1$, $R^2$, and $R^3$ are each selected from hydrogen and alkyl; $R^4$ is 0–2 substituents and $R^6$ is 0 or 1 substituent selected from alkyl, alkoxy, halogen, alkanoylamino, alkylthio, and aryloxy; and wherein the alkyl moieties of R, $R^4$, $R^5$ and $R^6$ are unsubstituted or substituted with 1–3 substituents independently selected from halogen, CN, OH, alkoxy, aryloxy, alkoxyalkoxy, alkanoyl, alkanoyloxy, carbamoyl, alkylcarbamoyl, sulfamoyl, alkylsulfamoyl, aryl, alkoxycarbonyl, alkoxyalkanoyloxy, and cycloalkyl.

2. The dye of claim 1 wherein $R^5$ is 0–3 substituents selected from Cl, Br, alkyl, alkoxy, and —$SO_3M$; R is alkyl, or alkyl substituted with 1–3 substituents independently selected from hydroxy, Cl, Br, alkoxy, carbamoyl, alkanoyloxy, alkoxycarbonyl, cyano, phenyl, and sulfamoyl; $R^1$, $R^2$ and $R^3$ are each independently selected from H and alkyl; and $R^4$ is 0–2 substituents independently selected from alkyl, alkoxy, alkylthio, phenyl, and alkanoylamino.

3. The dye of claim 2 wherein $R^5$ is H or one of said substituents in the 4 or 5 position, and $R^4$ is H or one of said substituents in the seven position.

4. The dye according to claim 1 of the formula

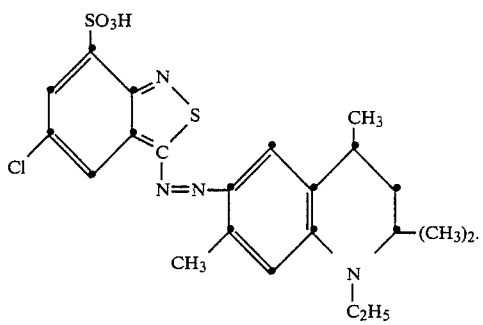

5. The dye according to any one of claims 1, 2 and 3 wherein the coupler has the formula

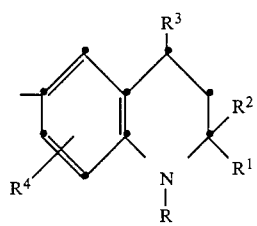

wherein R, $R^1$, $R^2$, $R^3$ and $R^4$ are as defined therein.

6. The dye according to any one of claims 1, 2 and 3 wherein the coupler has the formula

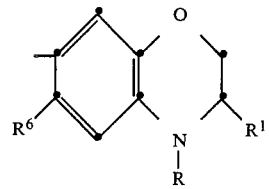

wherein R, $R^1$ and $R^6$ are as defined therein.

7. The dye according to claim 1 of the formula

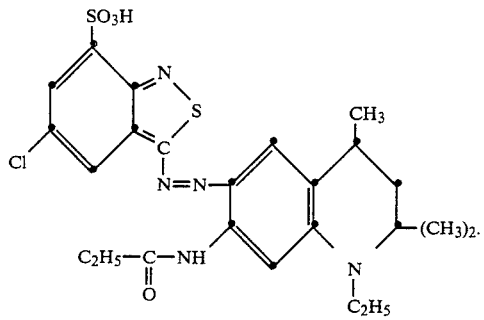

8. The dye according to claim 1 of the formula

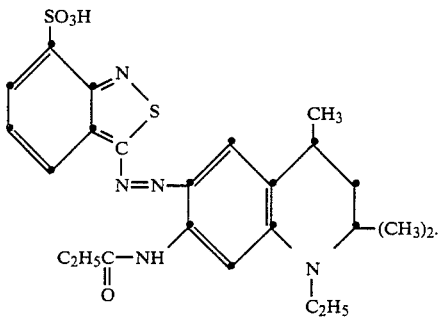

9. The dye according to claim 1 of the formula

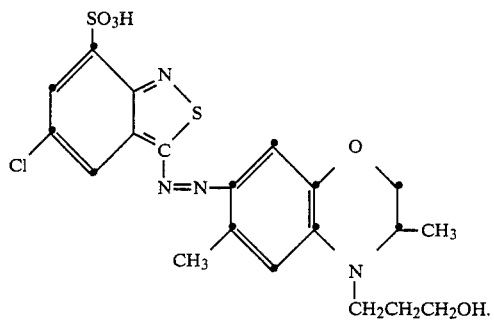

10. The dye according to claim 1 of the formula

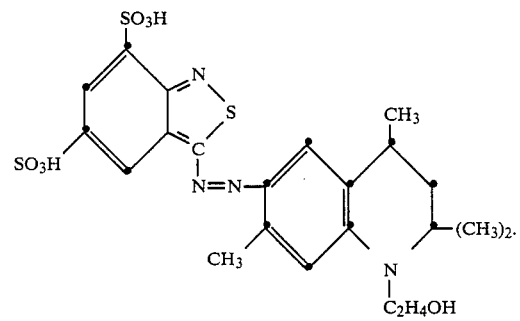

* * * * *

UNITED STATES PATENT AND TRADEMARK OFFICE
CERTIFICATE OF CORRECTION

PATENT NO. : 4,530,997
DATED : July 23, 1985
INVENTOR(S) : Max A. Weaver and Ralph R. Giles It is certified that error appears in the above-identified patent and that said Letters Patent are hereby corrected as shown below:

The title should read ---AZO DYES FROM SULFONATED 3-AMINO-2,1-BENZISOTHIAZOLES WITH 1,2,3,4-TETRAHYDROQUINOLINE OR 2,3-DIHYDRO-1,4-BENZOXAZINE COUPLERS---

Signed and Sealed this

Twelfth Day of November 1985

[SEAL]

Attest:

DONALD J. QUIGG

Attesting Officer

Commissioner of Patents and Trademarks